United States Patent
Brame et al.

(10) Patent No.: US 7,629,436 B2
(45) Date of Patent: Dec. 8, 2009

(54) CONTACT LENS EXTRACTION/HYDRATION SYSTEMS AND METHODS OF REPROCESSING FLUIDS USED THEREIN

(75) Inventors: Philip A. Brame, Southampton (GB); Sarah L. Almond, Eastleigh (GB)

(73) Assignee: CooperVision International Holding Compound, LP, St. Michael (BB)

( * ) Notice: Subject to any disclaimer, the term of this patent is extended or adjusted under 35 U.S.C. 154(b) by 0 days.

(21) Appl. No.: 12/002,837

(22) Filed: Dec. 18, 2007

(65) Prior Publication Data

US 2008/0103288 A1 May 1, 2008

Related U.S. Application Data

(63) Continuation of application No. 11/200,863, filed on Aug. 9, 2005, now Pat. No. 7,319,133.

(51) Int. Cl.
*C08G 65/46* (2006.01)
*B32B 27/36* (2006.01)

(52) U.S. Cl. ............... 528/491; 264/176.1; 264/219; 359/642; 428/411.1

(58) Field of Classification Search ............ 264/176.1, 264/219; 359/642; 428/411.1, 412; 528/491
See application file for complete search history.

(56) References Cited

U.S. PATENT DOCUMENTS

| | | | |
|---|---|---|---|
| 5,080,839 A | | 1/1992 | Kindt-Larsen |
| 5,094,609 A | | 3/1992 | Kindt-Larsen |
| 5,260,000 A | | 11/1993 | Nandu et al. |
| 5,640,980 A | | 6/1997 | Keene et al. |
| 5,690,866 A | | 11/1997 | Andersen et al. |
| 5,762,081 A | | 6/1998 | Keene et al. |
| 5,836,323 A | | 11/1998 | Keene et al. |
| 6,015,609 A | | 1/2000 | Chaouk et al. |
| 6,071,439 A | * | 6/2000 | Bawa et al. .............. 264/1.1 |
| 6,183,705 B1 | | 2/2001 | Chang |
| 6,207,086 B1 | | 3/2001 | Schlagel et al. |
| 6,348,507 B1 | * | 2/2002 | Heiler et al. ............... 514/769 |
| 6,423,820 B1 | | 7/2002 | Ayyagari et al. |
| 6,432,217 B1 | | 8/2002 | Baxter et al. |
| 6,790,873 B2 | | 9/2004 | Tomono et al. |
| 7,022,813 B2 | | 4/2006 | Ayyagari et al. |
| 7,319,133 B2 | | 1/2008 | Brame et al. |
| 2003/0222362 A1 | | 12/2003 | Indra et al. |
| 2004/0091613 A1 | | 5/2004 | Wood et al. |
| 2004/0119176 A1 | * | 6/2004 | Xia et al. .................. 264/1.32 |

FOREIGN PATENT DOCUMENTS

| | | |
|---|---|---|
| WO | WO 95/11789 | 4/1995 |
| WO | WO 01/23066 | 4/2001 |
| WO | WO 2005/025843 | 3/2005 |
| WO | WO 2005/113028 | 12/2005 |

OTHER PUBLICATIONS

USPTO Office Action dated May 3, 2007 in related U.S. Appl. No. 11/200,863, filed Aug. 9, 2005, now U.S. Patent 7,319,133.
U.S. Appl. No. 11/200,848, filed Aug. 9, 2005.
U.S. Appl. No. 11/200,648, filed Aug. 9, 2005.
U.S. Appl. No. 11/200,644, filed Aug. 9, 2005.
U.S. Appl. No. 11/201,410, filed Aug. 9, 2005.
U.S. Appl. No. 11/200,862, filed Aug. 9, 2005.
U.S. Appl. No. 11/201,409, filed Aug. 9, 2005.

* cited by examiner

*Primary Examiner*—Terressa M Boykin
(74) *Attorney, Agent, or Firm*—Stout, Uxa, Bayan & Mullins, LLP; Frank J. Uxa; Greg S. Hollrigel (57) ABSTRACT

The present contact lens treating systems and methods effectively remove extractable materials from contact lenses, for example, newly formed contact lenses, so that the lenses can be safely and conveniently worn, for example, for extended periods of time. Such treatment methods and the present extraction medium reprocessing methods allow lens treatment while reducing extraction medium losses, thereby reducing costs of these materials and the burden of such treatment on the environment. The present methods can also be useful for manufacturing a heat stabilized contact lens, for example, a water swelled contact lens including a Vitamin E component which is insoluble in the lens in a hydrated state.

14 Claims, 2 Drawing Sheets

CONTACT LENS EXTRACTION/HYDRATION SYSTEMS AND METHODS OF REPROCESSING FLUIDS USED THEREIN

CROSS-REFERENCE TO RELATED APPLICATIONS

This application is a continuation of U.S. application Ser. No. 11/200,863, filed Aug. 9, 2005, the disclosure of which is hereby incorporated in its entirety herein by this reference.

BACKGROUND OF THE INVENTION

The present invention relates to methods for making and treating contact lenses and methods for reprocessing fluids used in treating contact lenses. More particularly the invention relates to methods for making and treating contact lenses to remove undesirable extractable materials from the contact lenses prior to packaging the lenses and prior to use of the lenses by an individual, and to methods for reprocessing, for example, for reuse, fluid materials, such as extraction media, aqueous media and the like, used in the treatment of contact lenses.

Contact lenses, particularly newly molded contact lenses, often are processed using one or more fluids, for example, liquids to remove undesirable components from the lenses prior to packaging of the lenses. To illustrate, newly formed polymeric contact lenses, such as silicone hydrogel contact lenses or contact lenses which comprise a silicone hydrogel material, often contain unreacted monomers which are removed by extracting the monomers from the lenses with a liquid medium, such as a non-aqueous liquid medium or an organic solvent. After the extraction processing, the contact lens is contacted with an aqueous liquid medium to hydrate the lens, for example, to swell the lens with water.

During such fluid processing, relatively large amounts of fluids, such as solvents, are used and are discarded. This represents a substantial cost in contact lens manufacturing. In addition, discarding or disposing of such large amounts of solvents can be an environmental concern and present risks to people handling the solvents and involved in the extraction processes.

In addition, contact lenses including hydrophilic polymeric materials are often subjected to elevated temperatures, for example, during sterilizing, packaging, cleaning, disinfecting and the like processing. Such elevated temperatures may result in damage, for example, discoloring, weakening and/or other damage and the like, to the contact lenses.

Thus, there remains a need for systems and methods which effectively extract undesirable components, such as unreacted monomers, from the contact lenses, such as silicone hydrogel contact lenses, and hydrate such extracted contact lenses, and which are cost effective and safe to use. There also remains a need for systems and methods to enhance the heat stability of the contact lenses or lens materials to reduce deleterious effects of elevated temperatures to which such lenses are exposed.

SUMMARY OF THE INVENTION

New systems and methods for treating contact lenses and methods for reprocessing extraction medium used in treating contact lenses have been discovered. The present contact lens treating systems and methods are effective in removing extractable materials, such as unreacted monomers or monomeric components, from unextracted contact lenses, such as unextracted silicone hydrogel contact lenses. Unlike systems and methods for cleaning contact lenses after they have been worn on an eye, the present systems and methods are used to extract and hydrate or otherwise treat newly formed, for example, newly molded, contact lenses prior to the lenses being initially packaged, so that the lenses can be safely and comfortably worn on the eye, for example, for extended periods of time. The present treatment systems and methods and the present extraction medium reprocessing methods generally utilize stepwise processing of lenses to obtain effective and efficient removal of extractable materials therefrom. In addition, the methods provide for highly efficient and effective recycling of extraction medium thereby reducing contact lens manufacturing costs as well as burden of these materials on the environment and the risk to people involved in the treatment of contact lenses.

The present methods are relatively straightforward to practice, while providing lens wearing benefits, economic benefits, and environmental benefits.

In a broad aspect of the present invention, methods for treating contact lenses are provided which comprise:

(a) contacting a swellable, for example, liquid swellable, polymeric contact lens containing extractable material with an extraction medium, for example, a liquid extraction medium other than pure water, at conditions effective to swell the contact lens with the extraction medium, to reduce the amount of extractable material in the contact lens, and to form a used extraction medium containing extractable material;

(b) contacting the contact lens having a reduced amount of extractable material with water to form a water swelled contact lens;

(c) processing the used extraction medium to produce a reprocessed extraction medium having a reduced concentration of extractable material relative to the used extraction medium; and (d) using the reprocessed extraction medium as at least a portion of the extraction medium in step (a).

The present methods of treating contact lenses may be used with any swellable, polymeric contact lenses, for example and without limitation, conventional so-called hydrogel polymeric contact lenses, hydrophilic polymeric contact lenses substantially free of silicon, other hydrophilic polymeric contact lenses and the like. The present methods are very usefully employed to treat contact lenses which comprise a hydrophilic silicon-containing polymeric material, for example, such materials as are used in contact lenses commonly referred to as silicone hydrogel contact lenses. As the term implies, a swellable, polymeric contact lens is a polymeric contact lens which is capable of becoming swelled with a medium, such as a liquid medium, for example, the extraction medium, one or more other fluid media used in accordance with the present invention, aqueous medium, water and mixtures thereof. For example, when fully hydrated, such swellable contact lenses may include between about 15% or about 20% to about 50% or about 80% by weight of water, for example, at equilibrium conditions.

Step (a) of the present methods may be repeated, for example, at least once or at least twice or more. In one very useful embodiment, the extraction medium includes less than about 15% by weight of water or less than about 10% by weight of water or less than about 5% by weight of water.

In a very useful embodiment, step (a) of the present methods is conducted at conditions so that the amount of extractable material in the contact lens is reduced by at least about 50% or at least about 70% or at least about 90% or more.

In one very useful embodiment, step (a) of the present contact lens treating methods includes contacting the contact lens with a first extraction medium portion and, thereafter, contacting the contact lens with a second extraction medium portion having a reduced concentration of water relative to the first extraction medium portion. This processing sequence of step (a) is advantageous in reducing the stress on contact lenses being processed. Such contact lenses often are at least partially hydrated, that is, are at least partially swelled with water. Using an initial extraction medium which includes some amount of water, such as 5% to 15% water, reduces the stress on, and, therefore, reduces the risk of damaging, the contact lens in going from a substantially water environment to a substantially non-aqueous extraction medium environment, such as a solvent based environment that comprises 1% or less water. Such processing sequence also takes into account the fact that the non-aqueous portion of the extraction medium is very effective in removing extractable materials from the contact lens, such as organic materials including unpolymerized monomers and the like. Thus, for extraction effectiveness/efficiency, it is advantageous that the contact lens be contacted at least once with an extraction medium which is substantially non-aqueous, such as a solvent or organic solvent based medium. In one embodiment, the contacting of the contact lens with second extraction medium portion having a reduced concentration of water, or a greater concentration of organic solvent, is repeated, for example, repeated at least once or at least twice or more.

As noted above, the extraction medium is a medium other than pure water. For example, the extraction medium may include at least one component effective to solubilize extractable material contained in the contact lens. Such component often is a non-aqueous component. Any suitable non-aqueous component or components may be included in the present extraction medium provided that each such component or components is effective in at least facilitating the removal of extractable material from the contact lens and can be removed from the lens to avoid any significant or undue detrimental effect on the contact lens or on the wearing of the contact lens or on the wearer of the contact lens.

In one embodiment, the extraction medium comprises at least one organic component, for example and without limitation, an alcohol component, with the organic component being effective to solubilize at least a portion of the extractable material in the contact lens.

In one particularly useful embodiment, the extraction medium comprises an alcohol selected from the group consisting of methanol, ethanol, propanol (1-propanol and/or isopropanol) and the like and mixtures thereof. Examples of such mixtures include, without limitation, ethanol and methanol; ethanol and propanol and the like. For example, the extraction medium may comprise a major amount by weight of ethanol on a water free basis. As used herein, the term "a major amount" refers to an amount equal to at least about 50%. In one very useful embodiment, the extraction medium comprises at least about 80% by weight or at least about 90% by weight or at least about 95% by weight of ethanol on a water free basis.

Advantageously, prior to step (b), the contact lens is contacted with a composition containing more than about 5% by weight of water and an organic solvent component. This feature of the present invention facilitates allowing the lens to be transitioned from a substantially non-aqueous extraction medium environment to a substantially aqueous environment in which the lens is hydrated and prepared for packaging. In other words, the contacting with a composition containing more than about 5% by weight of water reduces the stress on the lens, and therefore reduces the risk of damaging the lens, in going from a substantially extraction medium environment to a substantially aqueous environment. The composition containing more than about 5% by weight of water may contain up to about 20% or up to about 40% or up to about 60% by weight of water. For example, one measure of lens stress is the amount of lens expansion which occurs in going from a substantially extraction medium environment to a substantially aqueous environment. To illustrate, for some contact lenses made of a hydrophilic silicon-containing polymeric material the following relationship between environment and % diameter expansion of the lens has been found:

| Environment | % Expansion of Lens Diameter |
|---|---|
| 100% by wt. Deionized Water | 0 |
| 50% by wt. deionized Water 50% by wt. ethanol/methanol blend (industrial methylated spirits "IMS") | 24 |
| 15% by wt. Deionized Water 85% by wt. IMS | 54 |
| 100% by wt. IMS | 100 |

By moving from a substantially extraction medium environment to a substantially aqueous environment in more than one step, as set forth herein, the lens is allowed to contract at a slower rate, thereby reducing stress on the lens.

In the present methods of treating contact lenses, step (b) may be advantageously repeated, for example, repeated at least once or at least twice or more. Repeating step (b) facilitates producing a contact lens product which is substantially free of any non-aqueous material present in the extraction medium.

In another broad aspect of the present invention, methods for reprocessing an extraction medium used in removing extractable material from a polymeric contact lens are provided. Such methods comprise:

(1) contacting a used extraction medium other than pure water containing an amount of water and extractable material from a polymeric contact lens with an extraction medium having substantially no extractable material at conditions effective to produce a first product having a reduced content of water and a reduced content of the extractable material relative to the used extraction medium; and (2) contacting at least a portion of the first product with the extraction medium at conditions effective to produce a second product having a reduced content of water relative to the first product.

In a very useful embodiment, the present methods may comprise contacting a portion of the first product with a polymeric contact lens containing extractable material at conditions effective to remove at least a portion of the extractable material from the contact lens. This contacting forms a first contact lens product having a reduced amount of extractable material relative to the polymeric contact lens prior to the contacting with the first product, and forms at least a portion of the used extraction medium. As used herein, a contact lens product, such as a first contact lens product, a second contact lens product, etc., refers to a contact lens at different stages of extraction (e.g., at different stages where the contact lens contains different amounts of extractable components). It can be understood that the use of the phrases first, second, third, etc. contact lens products refers to a contact lens that has reduced amounts of extractable components as it proceeds through the present systems.

In one embodiment, the present methods further comprise contacting at least a portion of the second product with the first contact lens product at conditions effective to extract an additional amount of the extractable material from the first contact lens product. This contacting forms a second contact lens product having a reduced amount of extractable material relative to the first contact lens product and forms another portion of the used extraction medium.

In yet a further embodiment, the present methods further comprise contacting at least a portion of the second product with the second contact lens product at conditions effective to extract a further amount of the extractable material from the second contact lens product. This contacting forms a third contact lens product having a reduced amount of extractable material relative to the second contact lens product, and also forms a further portion of the used extraction medium.

In a further embodiment, the present methods further comprise contacting a portion of the first product with the second contact lens product in the presence of water at conditions effective to partially hydrate the second contact lens product. This contacting forms a first hydrated contact lens and an additional portion of the used extraction medium.

Alternately, the present methods further comprise contacting a portion of the first product with the third contact lens product in the presence of water at conditions effective to partially hydrate the third contact lens product. This contacting forms a first hydrated contact lens and a still further portion of the used extraction medium.

In a particularly useful embodiment, the present methods further comprise, prior to step (1), contacting at least a portion of the used extraction medium with a filter medium at conditions effective to remove contact lens debris and/or other solid and/or semi-solid materials, from the used extraction medium. In another embodiment, the present methods provide that step (1) includes contacting at least a portion of the used extraction medium with a removal medium, such as an activated removal medium, for example, activated carbon, at conditions effective to remove at least a portion of the extractable material from the used extraction medium.

The present methods may include the above-noted contacting with a filter medium and contacting with a removal medium together. In such an embodiment, the filter medium contacting preferably occurs prior to the removal medium contacting.

Thus, it can be understood that the present systems provide for recycling of the extraction media, including media that comprise an organic component such as an organic solvent, in connection with extracting unreacted components and the like from polymeric contact lenses. This is in contrast to existing systems which dispose of the organic solvents after extraction. The extraction media is filtered as needed to remove particulate matter and/or the extracted components from the contact lens. The filtered extraction media can then be mixed with "fresh" extraction media to provide a volume of extraction media containing a desired amount of water and effective in extracting extractable components from the newly polymerized contact lenses.

In yet another broad aspect of the invention, contact lenses are provided having enhanced heat stability, for example, enhanced ability to withstand elevated temperatures. The present contact lenses are safe to be worn in/on the eyes of humans and animals. Moreover, the present contact lenses can be produced using methodologies which are straightforward and easy to practice. In short, the present contact lenses provide substantial heat stability benefits, and can be produced relatively easily and cost effectively.

In this aspect of the invention, contact lenses may comprise a water swellable, polymeric lens body and a heat stabilizer component combined in the lens body in an amount effective to increase the heat stability of the contact lens relative to an identical contact lens without the heat stabilizer component. In one embodiment, the heat stabilizer component is insoluble in the lens body in a hydrated state. In one embodiment, the heat stabilizer component comprises a Vitamin E component or Vitamin E.

In a very useful embodiment, the lens bodies of the present contact lenses comprise a hydrophilic silicon-containing polymeric material and a Vitamin E component. The Vitamin E component in the present lenses is useful as a heat stabilizer component and is insoluble in the lens body in a hydrated state, that is, when the lens body is swelled with water. Preferably, the heat stabilizer component, for example, the Vitamin E component, is soluble in a non-aqueous liquid, for example, an alcohol component, such as that selected from methanol, ethanol, propanol, and the like and mixtures thereof. The presence of the Vitamin E component will be determined based on the hydrophilic silicon-containing polymeric material and the lens produced with such material. For example, some hydrophilic silicon-containing polymeric materials may have an adequate heat stability without an additional Vitamin E component, whereas other hydrophilic silicon-containing polymeric materials may benefit from the presence of a Vitamin E component.

In one embodiment, the Vitamin E component is selected from Vitamin E, salts of Vitamin E, derivatives of Vitamin E, and mixtures thereof. In a very useful embodiment, the Vitamin E component comprises Vitamin E.

In a further broad aspect of the present invention, methods of heat stabilizing a water swellable contact lens are provided. Such methods comprise contacting a water swellable contact lens with a material comprising a carrier component other than pure water, and a heat stabilizer component soluble in the carrier component and insoluble in the contact lens in a hydrated state. The contacting is effective to swell the contact lens with the material. The material swelled contact lens is contacted with water at conditions effective to replace at least a portion, for example, a major portion, and even substantially all, of the carrier component in the contact lens with water, thereby forming a water swelled contact lens including an effective amount of the heat stabilizer component.

In the present methods, the contact lens advantageously comprises a hydrophilic polymeric material, for example, a hydrogel-forming polymeric material, a hydrophilic silicon-containing polymeric material and the like. In one embodiment, the heat stabilizer component comprises a Vitamin E component. The carrier component comprises a non-aqueous component, for example, an alcohol component. The carrier component preferably includes a material selected from methanol, ethanol, propanol and the like and mixtures thereof.

Any and all features described herein and combinations of such features are included within the scope of the present invention provided that the features of any such combination are not mutually inconsistent.

These and other aspects and advantages of the present invention are apparent in the following detailed description, claims and drawings in which like parts bear like reference numerals.

DETAILED DESCRIPTION

The present invention is very useful in treating swellable polymeric contact lenses, for example, contact lenses comprising hydrophilic polymeric materials, and in reprocessing the fluid materials used to treat such lenses. Such contact lenses are often described as being swellable contact lenses in that during use of such contact lenses the lenses include sufficient amounts of water to be swelled by such water. For example, such contact lenses often include about 10% or about 15% or about 20% to about 50% or about 60% or about 80% by weight of water in an equilibrium state, for example, when being worn on an eye. Such contact lenses are often referred to as soft hydrophilic contact lenses or hydrogel contact lenses. In one particularly useful embodiment, the contact lenses include hydrophilic silicon-containing polymeric materials. The contact lenses to be treated are often produced using hydrophilic monomeric materials, that is hydrophilic monomers, for example, together with one or more other monomers, which are polymerized in forming the contact lenses.

The present invention is very useful during the later stages of contact lens manufacturing. For example, the present invention is useful in treating contact lenses which have been recently formed, for example, by polymerization of one or more monomers. Such recently formed contact lenses often include amounts of extractable materials, such as one or more monomeric components which have failed to react or failed to react completely during the polymerization processing and/or other extractable materials present in such lenses. In order to provide contact lenses suitable for safe and effective wear in the eyes of humans or animals, such recently formed contact lenses advantageously are treated to remove such extractable materials. The present systems and methods are used prior to the initial packaging of contact lenses in sealed packages, such as blister packs and the like. Thus, the present systems and methods are used prior to the lenses being worn on an eye, and can be distinguished from methods of cleaning contact lenses after placement on an eye of an individual.

The present invention is directed to processing which is effective to remove such extractable materials from contact lenses and provide contact lenses which are safe and effective in use. The invention is also related to reprocessing the fluids, for example, liquid, materials used in treating such contact lenses to provide substantial benefits, for example, reduced costs, reduced adverse environmental impacts of such contact lens treating and the like. In addition, the present invention is directed to methods of heat stabilizing a water swellable contact lens, and to contact lenses that include heat stabilizing components.

Embodiments and aspects of the present invention are illustrated in, and will be described with reference to, FIG. 1. However, it should be understood that the present invention is not limited to the embodiments and aspects shown in FIG. 1, and that any and all embodiments of and modifications consistent with the present methods as set forth herein are included within the scope of the present invention.

As used herein, the term "extraction medium" includes any suitable material, other than pure water, which is useful to reduce the amount of extractable material included in and/or on a contact lens being treated in accordance with the present invention. The extraction medium often includes a non-aqueous component effective to solubilize extractable material in and/or on the contact lens, and/or to otherwise combine with such extractable material so that such extractable material is removed or extracted from the contact lens being treated. Examples of non-aqueous components which may be included in the present extraction media include, without limitation, components, such as organic components, that are effective in reducing the amount of extractable material in the contact lenses being treated and, in addition, have no significant or undue detrimental effect on the contact lens being treated, on the wearing of the contact lens, or on the wearer of the contact lens.

In one embodiment, the extraction medium includes at least one alcohol, for example and without limitation, at least one alkanol. The extraction medium may include an alcohol selected from the group consisting of methanol, ethanol, propanol and the like, and mixtures thereof.

In one very useful embodiment, the extraction medium comprises a major amount by weight of ethanol, such as a mixture of about 97% by weight of ethanol and about 3% by weight of methanol. An example of a useful extraction medium is industrial methylated spirits (IMS), which is typically about 99.7% by weight water free. It should be noted that the extraction medium may also include an amount of water, preferably a minor amount of water, that is less than about 50% by weight of water.

Figure 1:
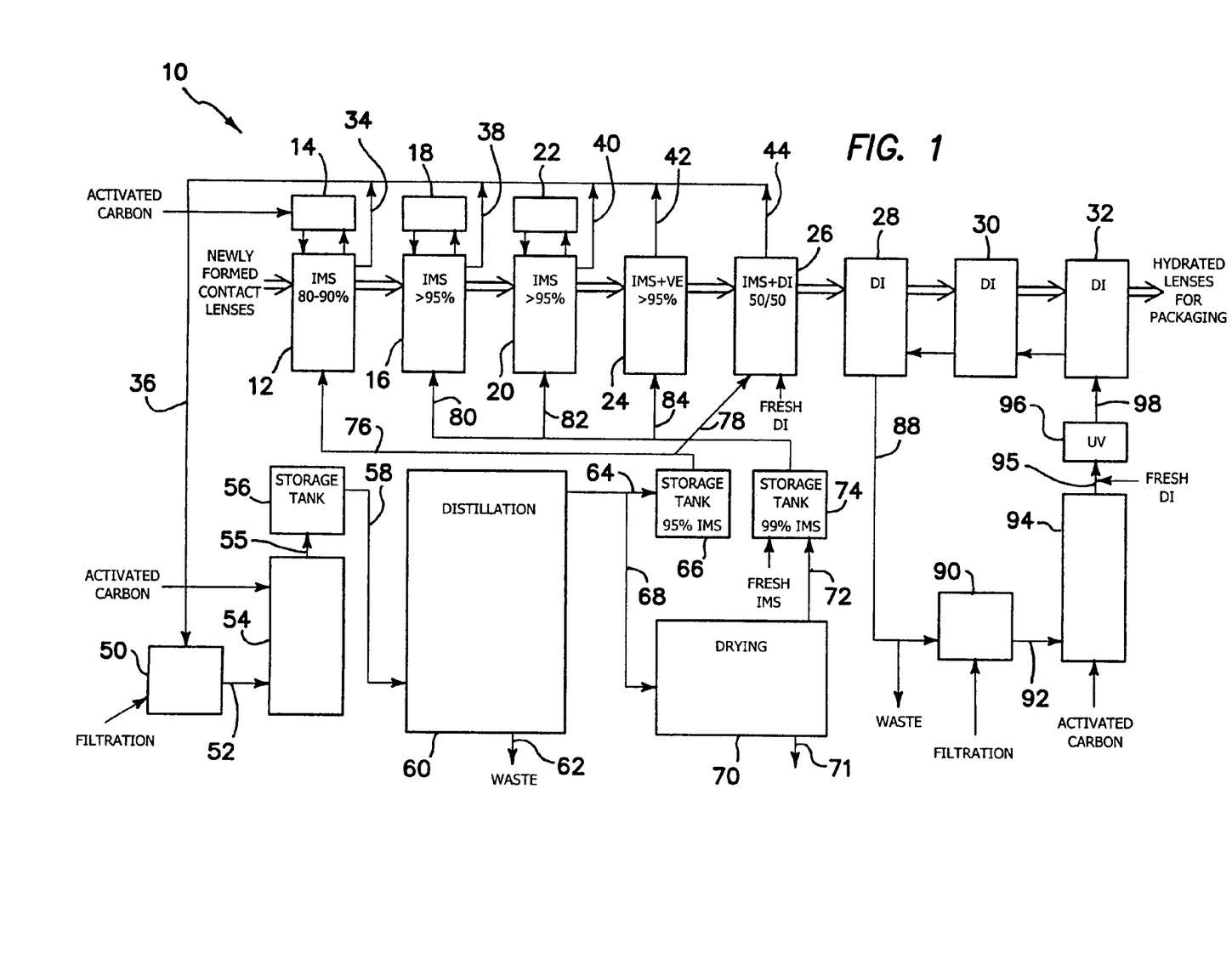
FIG. 1 is a schematic flow diagram of one embodiment of the present invention.

With reference to FIG. 1, newly formed swellable, polymeric contact lenses, for example, such lenses containing a hydrophilic, silicon-containing polymeric material, are processed in system 10. Such lenses are provided to first stage 12 of system 10. These lenses include unreacted monomers, and possibly other extractable material, which are to be removed before the lenses can be packaged for shipment/sale.

Each of the stages referred to herein includes a tank which is sometimes referred to by the same reference numeral as the stage in which it is included. Each such tank defines a chamber in which contacting between the lenses being treated and a liquid medium, as described herein, occurs.

In first stage 12, the lenses are contacted with a liquid composition containing about 80% to about 95% IMS and about 5% to about 20% by weight of water. Such contacting occurs at a temperature in a range of about 20° C. to about 50° C. The operating temperatures of first stage 12, as well as second, third, fourth, fifth and sixth stages 16, 20, 24, 26 and 28, described hereinafter, are in a range of about 20° C. to about 50° C. In certain embodiments, the stages are operated at room temperature. These stages are enclosed within the same module or enclosure for safety reasons. Seventh and eighth stages 30 and 32, described hereinafter, are operated at less than about 25° C., for example, at ambient or room temperature.

The contacting between the contact lenses and the liquid composition in first stage 12, as well as the contacting between the contact lenses and the other liquid compositions/liquid materials in the other stages described herein, is conducted for a period of time effective to obtain the desired degree of mass transfer, and advantageously effective to provide cost effective and efficient treatment of the contact lenses. Excessively short contacting times may require additional stages to achieve the desired results. Such additional stages are costly and may involve excess handling or moving of the lenses, with an increased risk of damaging the lenses. On the other hand, excessively long contacting times may require larger contacting vessels and more processing fluids, each of which involves additional costs. In one embodiment, contacting times are in a range of about 0.1 hour or about 0.2 hour or about 0.4 hour to about 0.6 hour or about 1 hour or about 2 hours or more. In the embodiment shown in FIG. 1, the contacting of the lenses and the liquid composition in first stage 12 occurs for about 45 minutes. This time can be adjusted, if necessary to achieve the desired result.

In addition, ultrasonic energy, produced using a conventional ultrasonic energy generator, may optionally be applied to the liquid composition in the first stage 12 to facilitate intimate contacting between the liquid composition and the contact lenses in first stage 12. In one embodiment, such intimate contacting between the liquid composition and contact lenses is facilitated through continuous liquid composition agitation from the continuous topping up of the tank in stage 12 and continuous draining of the liquid composition from the tank via a conventional weir system.

In any event, intimate contacting between the liquid composition and the contact lenses is obtained in first stage 12 so that the lenses become swelled with the liquid composition and mass transfer occurs between the lenses and the liquid composition. Some of the extractable material originally in or on the lenses is removed from the lenses in first stage 12 and is present in the liquid composition outside the lenses.

During and after such contacting, the liquid composition in first stage 12 may optionally be pumped through a first activated zone 14 which contains activated carbon. The liquid composition from the first stage 12 may be passed through the activated carbon in first activated zone 14 and passed back into first stage 12. The activated carbon in first activated zone 14 removes some of the extractable material which is removed from the contact lenses in first stage 12, and thus helps to prolong the effectiveness of the liquid composition in first stage 12.

First stage 12, like the other stages described hereinafter (unless expressly stated otherwise) may be equipped with at least one pump, for example, of conventional design, to pass the liquid in first stage 12 through first activated zone 14 and/or to pump the liquid out of first stage 12 for reprocessing, for example, if the lens treating which occurs in the stage is conducted in a batch-wise mode with respect to the treating liquid or liquids being employed as is described elsewhere herein. Such pumping action also facilitates intimate contacting between the liquid and contact lenses in first stage 12. In addition, each of the stages, unless expressly stated otherwise, may employ ultrasonic energy, as described with regard to first stage 12, to facilitate intimate contacting between the liquid and contact lenses in such stage.

Lens processing in first stage 12, and unless expressly stated otherwise, in each of the other stages, is batchwise with respect to the contact lenses being treated. In other words, a batch of contact lenses is processed in one stage, for example, first stage 12. After completion of processing in the one stage, the batch of lenses, for example, in suitably stacked trays and lens holders, are moved to the next stage for further processing. This is continued until the batch of lenses has been processed in each of the stages, as described herein. Examples of useful trays include color coded trays that have openings to provide contact between contact lenses located on the trays and the liquid compositions. Color coded trays may be useful to facilitate visualization of the individual lens located thereon. For example, the trays may comprise a color component that contrasts with a tint of the contact lens to make the lens relatively easy to see by a person. The trays are designed to be stacked upon each other. For example, a first tray and a substantially identical second tray can be stacked together to form a tray assembly. The first tray includes a plurality of wells, each well being structured to contain a single contact lens. The second tray can be placed over the first tray to act as a lid for the first tray and to further hold contact lenses in the wells of the second tray. Stacks of trays, such as stacks of 4, 8, 16, 32, or more trays can be provided in one or more carriers that can be used to transfer the lenses among the different stages of the present systems.

In one embodiment, the liquid composition in stage 12, as well as the liquid medium being used in each of the other stages, unless expressly noted to the contrary, is continuously replenished, for example, from line 76, as described hereinafter, and excess (used) liquid composition is continuously passed out of stage 12, for example, is passed over a conventional weir or dam-like device out of first stage 12, through line 34 for reprocessing. In this embodiment, the lens treating can be said to be continuous with respect to the liquid composition being used in stage 12.

In an alternate embodiment, the liquid composition in first stage 12, as well as the liquid medium being used in each of the other stages, unless expressly noted to the contrary, is maintained in service until its chemical make-up is deemed to no longer be suitable to perform its function in first stage 12. When the liquid medium is deemed no longer suitable, it is removed from stage 12 as a single batch, and replaced by a new batch of reprocessed liquid composition. This type of operation can be considered to be batchwise operation with respect to the liquid medium used to treat the contact lenses.

The chemical make-up of this liquid composition can be monitored, for example, for IMS and/or water and/or extractable material content. Alternatively, or in addition, based on experience with an individual system, the liquid composition in first stage 12 may be used to treat a certain number of batches of lenses, for example, 1 or 2 or 3 batches of lenses to about 5 or about 7 or more batches of lenses, before being removed and replaced.

In any event, the used liquid composition is removed from first stage 12 for reprocessing and replaced with a reprocessed liquid composition, as is described elsewhere herein. The liquid compositions/materials in the other stages are used/removed/replaced continuously or batch-wise in much the same manner as described herein with regard to the liquid composition in stage 12.

After about 45 minutes, the contact lenses are removed from first stage 12 and placed in second stage 16. The contact lenses are contacted in second stage 16 with a liquid composition containing IMS at a concentration of greater than about 95% by weight, the remainder of the liquid material being water, for about 45 minutes. Contacting times may range in second stage 16, as well as in all the other stages described herein as described with regard to the contacting in stage 12. Conventional heating elements may be employed, for example, external to the walls of the second stage 16, which can be insulated for energy efficiency, to maintain the desired temperature.

The concentration of IMS is increased between first stage 12 and second stage 16. The original, newly formed contact lenses are at least partially hydrated with water. In first stage 12, this water is replaced with the liquid composition in first stage 12. These lenses are then passed to second stage 16 where they are swelled with a liquid material having a higher concentration of IMS. Allowing the newly formed, hydrated lenses to pass through first stage 12 before being exposed to a high concentration of IMS in second stage 16 reduces the stress to which the lenses would be exposed if they were to be passed directly from an aqueous environment to the high IMS concentration environment. The high concentration of IMS in second stage 16 is very effective in removing extractable material from the contact lenses.

Second activated zone 18 may optionally be provided so that the liquid material in the second stage 16 can be passed through activated carbon in second activated zone 18, and back to second stage 16, to remove extractable material in the liquid material from second stage 16, and to help prolong the effectiveness of the liquid material in second stage 16.

After about 45 minutes of contacting, the contact lenses are removed from second stage 16 and placed in third stage 20.

Third stage 20 provides for further contacting the contact lenses with a liquid material containing IMS at a concentration greater than 95% by weight. In effect, the contacting in the third stage 20 is a repeat of the contacting in second stage 16. The liquid material from third stage 20 may optionally be passed to third activated zone 22 containing activated carbon. The liquid material from third activated zone 22, with a reduced concentration of extractable material, is returned to third stage 20.

This contacting in third stage 20 occurs for a period of time of about 45 minutes.

The contact lenses are removed from third stage 20 and include less extractable material than the contact lenses removed from second stage 16.

In some embodiments, the contact lenses are then placed in fourth stage 24 containing a liquid composition containing IMS at a concentration of greater than 95% by weight and about 50 to about 200 ppm by weight of Vitamin E. Vitamin E, which is soluble in this liquid composition in the fourth stage and insoluble in water, is used to enhance the heat stability of the contact lenses being processed. The temperature of the contacting in fourth stage 24 is in a range of about 20° C. to about 50° C. This contacting occurs for about 45 minutes.

In some embodiments of the present invention, Vitamin E is not employed. One such embodiment not employing Vitamin E is described hereinafter with respect to FIG. 2.

Still referring to FIG. 1, the contact lenses removed from fourth stage 24, including an effective amount of Vitamin E, are placed in fifth stage 26 for contact with a liquid composition including about 50% by weight IMS and about 50% by weight deionized water. This contacting occurs at a temperature between 20° C. and 50° C., for example, similar to the temperature of first stage 12, for about 45 minutes. This is a transition stage from about 95% by weight IMS to less than about 5% by weight IMS, and it reduces the stress on the lens from the associated shrinkage, as described elsewhere herein.

The contact lenses removed from fifth stage 26 are then placed in sixth stage 28 where the lenses are contacted with deionized water at less than about 20° C. to about 50° C.

After 45 minutes of contacting, the contact lenses are removed from sixth stage 26 and placed in seventh stage 30, where the lenses are again contacted with deionized water at a temperature of less than about 25° C., for example, similar to the temperature of first stage 12. Such contacting occurs for about 45 minutes.

The contact lenses are removed from seventh stage 30 and placed in eighth stage 32, where the lenses are again contacted with deionized water at a temperature of less than about 25° C. for about 45 minutes.

A final product hydrated lenses removed from eighth stage 32 are ready for packaging. For example, the hydrated lenses removed from eighth stage 32 may be contacted with a suitable packaging composition, for example, including a buffer, a tonicity agent and one or more other conventional materials used in packaging hydrophilic contact lenses.

The above description has, to a large extent, followed the path of contact lenses from being freshly removed from molding cups or mold sections to being hydrated lenses ready for packaging. The following description follows the processing and reprocessing of the extraction media and deionized water used in treating the lenses.

Again, with reference to FIG. 1, on a continuous basis, or batchwise, after it is determined, for example, by monitoring the chemical make-up of the liquid composition in first stage 12, that this used or spent composition is no longer suitable for effective/efficient functioning in first stage 12 and, therefore, is to be removed and replaced, the liquid composition from first stage 12 is passed (continuously weired or pumped batchwise) out of first stage 12 and passed through line 34 into common line 36. Similarly, the used or spent liquid material from second stage 16 is passed out of second stage 16 and is passed through line 38 into common line 36; the used or spent liquid material from third stage 20 is passed out of third stage 20 and is passed through line 40 into common line 36; the used or spent liquid composition from fourth stage 24 is passed out of fourth stage 24 and is passed through line 42 into common line 36; and the used or spent composition from fifth stage 26 is passed out of fifth stage 26 and is passed through line 34 into common line 36.

It is to be understood that each of the liquid compositions/liquid materials can be removed from its respective stage independently of removing one or more of the other of such liquid compositions/liquid materials from one or more of the other stages. Such removal or removals advantageously are accomplished so as to avoid any substantial, or even significant, interference with or disruption of the treating of the contact lenses, for example, as described elsewhere herein. The quality of the liquid composition/material may be measured and can be changed by automatic monitoring and replenishment. For example, if the concentration of IMS has dropped in first stage 12 below a specified lower limit, the rate of IMS replenishment could be increased to increase the concentration of IMS in that stage. In addition, a reprocessed liquid composition/liquid material is provided continuously or batchwise to such stage, as is discussed elsewhere herein. In this manner, the treating of contact lenses can continue without undue delay.

The liquid passing through common line 36 is brought into contact with a conventional micro porous filter medium in filter zone 50. This filter zone 50 is designed to remove lens debris and other solid or semi-solid debris and/or extraneous material from the system 10. Periodically, as needed for effective/efficient operation, the spent filter medium from filter zone 50 is discarded and replaced with fresh filter medium.

The filtered liquid is passed from filter zone 50 through line 52 into common activated zone 54 where the liquid is contacted with activated carbon to remove extractable material (previously removed from the contact lenses) from the liquid which is then passed through line 55 to a storage tank 56.

The liquid from storage tank 56 is passed through line 58 into distillation zone 60 where the liquid is separated into an eutectic composition containing about 95% by weight IMS and about 5% by weight of water, and an aqueous waste product, which is properly disposed of after being removed from distillation zone through line 62.

Distillation zone 60 comprises a conventional, and advantageously fully automatic, distillation apparatus in which a low boiling material, such as the composition containing about 95% by weight IMS, is the overhead product, and the higher boiling material, such as the aqueous waste product, is removed from the bottom of the apparatus. Since the distillation apparatus of distillation zone 60 may be conventional, its structure and operation is well within the skill of the art. Therefore, a detailed description of such structure and functioning is not presented herein.

A portion of the liquid containing about 95% by weight IMS is passed through line 64 into storage tank 66.

The remainder of the liquid containing about 95% by weight IMS from distillation zone 60 is passed through line 68 into a drying device 70 to remove water from this liquid and produce a product liquid having at least about 99% by weight IMS. This product liquid containing at least about 99% IMS is passed through line 72 to storage tank 74.

Drying device 70 may be of conventional construction, and is advantageously at least partially or even fully automated. For example, the drying device 70 may include a chamber filled with desiccant particles which remove water from a water-containing liquid being passed through the chamber. The spent particles, that is water-containing particles which can no longer effectively/efficiently remove water from the water-containing liquid in device 70, can be removed from drying device 70 and replaced. Alternatively, such particles can be treated, for example, at elevated temperatures, to drive off water and restore the ability of the particles to effectively/efficiently remove water from the water-containing liquid in device 70. Such drying devices and the particles useful in such drying devices are well known to those skilled in the art. Therefore, no detailed description of such devices and particles are presented here.

In one very useful embodiment, the drying device 70 used is a membrane separation or pervaporation device. The larger molecules of IMS pass over a micro porous membrane to be reused while the smaller water molecules are forced through to waste. Therefore, a further waste stream, shown passing through line 71, is generated by the drying device 70 for disposal.

A quantity of fresh liquid IMS is added to storage tank 74. This fresh IMS is added to make up for the IMS that is lost during the treating of the contact lenses and the reprocessing of the liquids used in such treating. One important advantage of the present invention is that reduced amounts of IMS (extraction medium) are required to treat the contact lenses because of the liquid reprocessing in accordance with the invention.

As shown in FIG. 1, the liquids in storage tanks 66 and 74 are passed to the individual stages 12, 16, 20, 24 and 26 to provide the desired liquid composition/liquid material for each such stage. For example, the liquid having about 95% by weight IMS from storage tank 66 is passed through line 76 to first stage 12 and through line 78 to fifth stage 26. The liquid having about 99% by weight IMS from storage tank 74 is passed to second, third and fourth stages 16, 20 and 24 through lines 80, 82 and 84 respectively.

The combination of filtration, activated carbon contacting, distillation, and drying, together with separate storage of different liquids having different IMS concentrations, provide for very effective removal of extractable material from the contact lenses and, at the same time, because of the reprocessing of the liquid compositions/materials as noted above, reduces the overall amount of IMS required to perform such treating.

In addition, as illustrated in FIG. 1, the deionized water is reprocessed as follows. The deionized water from sixth stage 28 is passed through line 88 to a filtration zone 90 which removes any solid or semi-solid materials present in this deionized water. The filtered deionized water is passed through line 92 into water activated zone 94 where the deionized water is contacted with activated carbon to remove extractable material (that has been removed from the contact lenses) present in the deionized water. The deionized water is then passed through line 95 to an ultraviolet (UV) light system 96 which irradiates the water and eliminates microbial contamination. Fresh, make-up deionized water is also introduced into line 95 and UV system 96. To prevent the deionized water becoming contaminated by IMS from carry over from fifth stage 26, fresh deionized water is added continually and a portion of the liquid from sixth stage 28 is weired to waste. Typically such portion is in a range of about 25% and about 90% of the tank volume.

The deionized water is then passed, for example, by weiring, through line 98 into eighth stage 32, through seventh stage 30, through sixth stage 28, and back to filtration zone 90.

Such reprocessing of the deionized water reduces the overall requirement for deionized water in treating the contact lenses.

Such liquid processing reduces the requirement for IMS by at least about 70% or about 80% or about 90%; and the requirement for deionized water by about 10% to about 75%.

In short, the present systems provide for very effective removal of extractable material from newly formed contact lenses and effective hydration of the product contact lenses so that such contact lenses are available for packaging for safe and comfortable wear by lens wearers. In addition, the reprocessing of extraction media and other fluids, e.g., IMS and deionized water, used in such contact lens treating cost effectively reduces the amount of extraction media and the other fluids required to treat the contact lenses. Reducing such requirements reduces the adverse environmental impact of such contact lens processing and reduces the costs of such contact lens processing.

The present invention is also directed to methods of heat stabilizing a contact lens and contact lenses including a heat stabilizing component.

Generally, the method includes contacting a water swellable contact lens with a material comprising a carrier component other than pure water, and a heat stabilizer component soluble in the carrier component and insoluble in the contact lens in a hydrated state. The contacting is effective to swell the contact lens with the material comprising the carrier component and heat stabilizing component. The material swelled contact lens is contacted with water at conditions effective to replace at least a portion, for example, a major portion, and even substantially all, of the carrier component in the contact lens with water, thereby forming a water swelled contact lens including an effective amount of the heat stabilizer component.

The present invention provides such contact lenses which comprise a lens body including a polymeric material and a heat stabilizer component. For example, a contact lens is provided comprising a lens body comprising a hydrophilic silicon-containing polymeric material and a heat stabilizer component. The heat stabilizer component is combined in the lens body in an amount effective to increase the heat stability of the contact lens relative to an identical contact lens without the heat stabilizer component. Advantageously, the heat stabilizer component is insoluble in the lens body in a hydrated state.

For example, a newly formed contact lens can be heat stabilized by contacting the lens with a material, for example a liquid medium, comprising a carrier component other than pure water, and a heat stabilizer component. The heat stabilizer component is soluble in the carrier component and insoluble in the contact lens in a hydrated state. The contacting is effective to swell the contact lens with the material. Next, the material swelled contact lens is then contacted with water at conditions effective to replace at least a portion, for example, a major portion, and even substantially all, of the carrier component in the contact lens with water, thereby forming a water swelled contact lens including an effective amount of the heat stabilizer component incorporated in the lens.

More specifically, the contact lens comprises a hydrophilic polymeric material, for example, a hydrogel-forming polymeric material, a hydrophilic silicon-containing polymeric material and the like. The heat stabilizer component comprises a Vitamin E component. The carrier component comprises a component in which Vitamin E is substantially or substantially entirely soluble. The carrier component comprises, for example a non-aqueous component, for example, an alcohol component. The carrier component preferably includes a material selected from methanol, ethanol, propanol and the like and mixtures thereof.

The heat stabilizer component is useful in certain embodiments, such as certain embodiments of silicone hydrogel contact lenses, in that it is substantially insoluble in the lens body in a hydrated state, that is, when the lens body is swelled with water. As discussed elsewhere herein, for example with respect to stage 24 in the processing system 10 shown in FIG. 1, the heat stabilizer component may comprise a Vitamin E component. The Vitamin E component may be selected from Vitamin E, salts of Vitamin E, derivatives of Vitamin E, and mixtures thereof. In a very useful embodiment, the Vitamin E component comprises Vitamin E.

A method of heat stabilizing a contact lens comprises for example, contacting a lens, for example a hydrophilic silicon containing lens with a first liquid medium comprising an IMS component and a Vitamin E component, at conditions effective to cause the lens to become swelled with the first liquid medium. The first liquid medium comprises for example a solution of an extraction medium containing about 80% to about 90%, or greater IMS, for example about 95% IMS and about 10% to about 20% or less by weight of water, and an effective amount of Vitamin E. In some embodiments of the invention, the first liquid medium comprises about 90%-95% IMS and about 5%-10% water and an effective amount of Vitamin E.

After the contacting with the first liquid medium, the lens, which is now swelled with the first liquid medium containing Vitamin E in a soluble state, is then contacted with a second liquid medium which renders the Vitamin E substantially insoluble. The second liquid medium comprises a substantial amount of water, for example, at least about 50% deionized water. Some of the carrier component held in the lens is replaced with water while most or all of the Vitamin E in the lens remains in the lens. The swelled lens is then moved to another stage where it is contacted with pure deionized water. As the Vitamin E is insoluble in water, the water, for example deionized water, replaces the first liquid medium in the lens, without substantially removing any of the heat stabilizing component from the lens. This stage may occur at between about 20° C. to about 25° C.

In some embodiments of the present methods, the now hydrated lens containing the heat stabilizing component, (e.g. Vitamin E) is transferred to another stage in which the hydrated, heat stabilized lens is contacted with a third liquid medium comprising deionized water and a suitable buffer component and/or suitable tonicity component.

Figure 2:
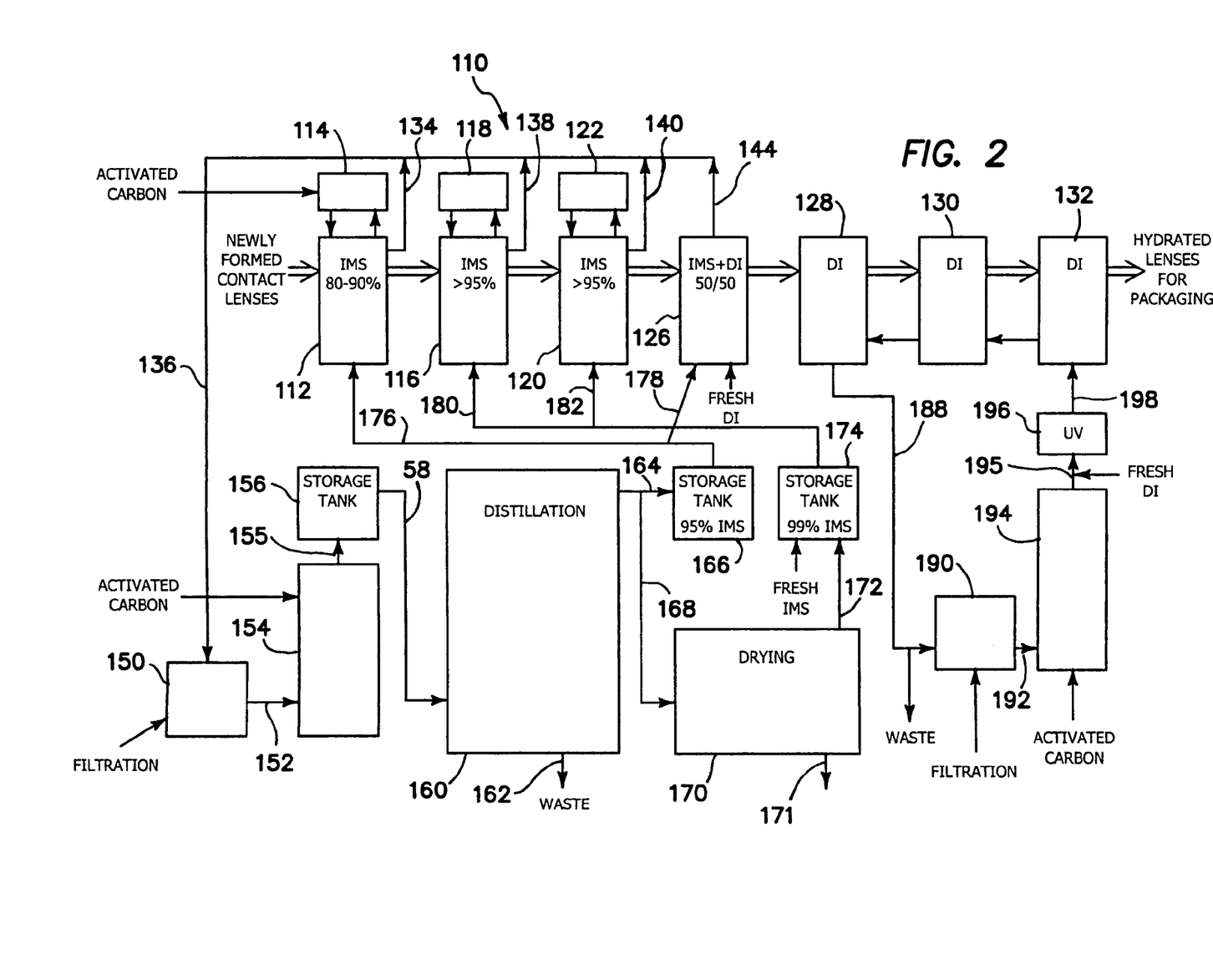
FIG. 2 is a schematic flow diagram of another embodiment of the present invention.

A preferred embodiment of the invention for processing lenses is shown and generally described with respect to FIG. 2. Except as expressly described herein, system 110 is similar to system 10 and features of system 110 which correspond to features of system 10 are designated by the corresponding reference numerals increased by 100. In other words, stages 112, 116, 120, 126 and 128 are essentially the same as stages 12, 16, 20, 26 and 28, respectively.

System 110 is substantially the same as system 10, with the primary difference being that stage 24, which includes contacting the lenses with a heat stabilizing solution, such as a solution including Vitamin E, is absent, and the contact lenses from third stage 120 are passed directly to fifth stage 126. Although not shown, in an alternative embodiment, another stage is provided between third stage 120 and fifth stage 126, which may be a repeat of stage 120.

With reference to FIG. 2, newly formed swellable, polymeric contact lenses, for example, such lenses containing a hydrophilic, silicon-containing polymeric material, are processed in system 110. Such lenses are provided to first stage 112 of system 110. These lenses include unreacted monomers, and possibly other extractable material, which are to be removed before the lenses can be packaged for shipment/sale.

In first stage 112, the lenses are contacted with a liquid composition containing about 80% to about 90% IMS and about 10% to about 20% by weight of water. Such contacting occurs at a temperature in a range of about 20° C. to about 50° C. The operating temperatures of first stage 112, as well as second, third, fifth and sixth stages 116, 120, 126 and 128, are in a range of about 20° C. to about 50° C. These stages may be enclosed within a common module or enclosure for safety reasons. Seventh and eighth stages 130 and 132 are operated at less than about 25° C., for example, at ambient or room temperature.

As in system 10, ultrasonic energy, produced using a conventional ultrasonic energy generator, may optionally be applied to the liquid composition in any one or more of stages 112, 116, 120, 126 and 128, to facilitate intimate contacting between the liquid composition and the contact lenses in such stages.

Intimate contacting between the liquid composition and contact lenses may be facilitated through continuous liquid composition agitation from the continuous topping of the tank and continuous draining of the liquid composition from the tank via a conventional weir system.

Preferably, intimate contacting between the liquid composition and the contact lenses is obtained in first stage 112 so that the lenses become swelled with the liquid composition and mass transfer occurs between the lenses and the liquid composition. Some of the extractable material originally in or on the lenses is removed from the lenses in first stage 112 and is present in the liquid composition outside the lenses.

During and after such contacting, the liquid composition in first stage 112 may optionally be pumped through a first activated zone 114 which contains activated carbon. The liquid composition from the first stage 112 may be passed through the activated carbon in first activated zone 114 and passed back into first stage 112. The activated carbon in first activated zone 114 removes some of the extractable material which is removed from the contact lenses in first stage 112, and thus helps to prolong the effectiveness of the liquid composition in first stage 112.

First stage 112, like the other stages described hereinafter (unless expressly stated otherwise), may be equipped with at least one pump, for example, of conventional design, to pass the liquid in first stage 112 through first activated zone 114 and/or to pump the liquid out of first stage 112 for reprocessing, for example, if the lens treating which occurs in the stage is conducted in a batch-wise mode with respect to the treating liquid or liquids being employed as is described elsewhere herein. Such pumping action also facilitates intimate contacting between the liquid and contact lenses in first stage 112.

The stages for processing and reprocessing of the extraction media and deionized water used in system 110 are essentially the same as described hereinabove with respect to system 10.

For example, after it is determined that the used or spent composition in stage 112 is no longer suitable for effective/efficient functioning in first stage 112 and, therefore, is to be removed and replaced, the liquid composition from stage 112 is passed out of first stage 112 and passed through line 134 into common line 136. Similarly, the used or spent liquid material from stages 116, 120 and 126 are passed out of these stages, through lines 138, 140 and 144, respectively, into common line 136.

The liquid passing through common line 136 is brought into contact with a conventional micro porous filter medium in filter zone 150 effective to remove lens debris and/or other solid or semi-solid debris and/or extraneous material from the system 110.

The filtered liquid is passed from filter zone 150 through line 152 into common activated zone 154 where the liquid is contacted with activated carbon to remove extractable material (previously removed from the contact lenses) from the liquid which is then passed through line 155 to a storage tank 156.

The liquid from storage tank 156 is passed through line 158 into distillation zone 160 where the liquid is separated into an eutectic composition containing about 95% by weight IMS and about 5% by weight of water, and an aqueous waste product, which is properly disposed of after being removed from distillation zone through line 162.

Distillation zone 160 comprises a conventional, and advantageously fully automatic, distillation apparatus in which a low boiling material, such as the composition containing about 95% by weight IMS, is the overhead product, and the higher boiling material, such as the aqueous waste product, is removed from the bottom of the apparatus. A portion of the liquid containing about 95% by weight IMS is passed through line 164 into storage tank 166.

The remainder of the liquid containing about 95% by weight IMS from distillation zone 160 is passed through line 168 into a drying device 170 to remove water from this liquid and produce a product liquid having at least about 99% by weight IMS. This product liquid containing at least about 99% IMS is passed through line 172 to storage tank 174.

A quantity of fresh liquid IMS is added to storage tank 174. This fresh IMS is added to make up for the IMS that is lost during the treating of the contact lenses and the reprocessing of the liquids used in such treating.

Liquids in storage tanks 166 and 174 are passed to the individual stages 112, 116, 120, and 126 to provide the desired liquid composition/liquid material for each such stage.

Like system 10, the combination of filtration, activated carbon contacting, distillation, and drying, together with separate storage of different liquids having different IMS concentrations, provide for very effective removal of extractable material from the contact lenses and, at the same time, because of the reprocessing of the liquid compositions/materials as noted above, reduces the overall amount of IMS required to perform such treating.

The deionized water may be reprocessed as follows. The deionized water from stage 128 is passed through line 188 to a filtration zone 190 which removes solid and/or semi-solid materials present in this deionized water. The filtered deionized water is passed through line 192 into water activated zone 194 where the deionized water is contacted with activated carbon to remove extractable material present in the deionized water. The deionized water is then passed through line 195 to an ultraviolet (UV) light system 196 which irradiates the water and eliminates microbial contamination. Fresh, make-up deionized water is also introduced into line 195 and UV system 196. The deionized water is then passed, for example, by weiring, through line 198 into stage 132, through stage 130, through stage 128, and back to filtration zone 190.

Such reprocessing of the deionized water reduces the overall requirement for deionized water in treating the contact lenses.

Such liquid processing reduces the requirement for IMS by at least about 70% or about 80% or about 90%; and the requirement for deionized water by about 10% to about 75%.

The present invention may be more clearly understood with reference to the following non-limiting Examples.

Example 1

A newly formed contact lens containing a hydrophilic, silicon-containing polymeric material is contacted with an extraction medium containing industrial methylated spirits (IMS), containing 97% by weight ethanol and 3% by weight methanol. In addition, the extraction medium contains a small amount of water, for example, less than 5% by weight of the total extraction medium. This contacting occurs for about 30-45 minutes at a temperature ranging from about 25° C. to about 50° C. Ultrasonic energy is applied during this contacting to agitate the extractive medium. This contacting results in the removal of undesirable extractable material, such as unreacted monomers, from the newly formed contact lens. In addition, the contacting results in the contact lens becoming swelled with the extraction medium.

This swelled contact lens is then contacted with a first liquid medium containing a different portion of the extraction medium. The liquid medium also includes 100 ppm by weight of Vitamin E, which is soluble in the liquid medium. This contacting occurs for 30 minutes at a temperature of less than about 25° C., for example, about 20° C., or room temperature. Ultrasonic energy is applied during this contacting to agitate the liquid medium so as to facilitate replacing the extraction medium with the liquid medium in the contact lens. The resulting contact lens is swelled with the first liquid medium containing Vitamin E.

In the next stage of processing, the resulting swelled contact lens is then contacted with a second liquid medium of substantially pure deionized water. This contacting occurs for 30 minutes at a temperature of less than 25° C., for example, about 20° C., or room temperature. Ultrasonic energy is applied during this contacting to agitate the second liquid medium so as to facilitate replacing the first liquid medium with the second liquid medium in the contact lens.

The contact lens produced by this processing is swelled with the second liquid medium. However, since Vitamin E is insoluble in the deionized water of the second liquid medium, the produced, swelled contact lens also contains an effective, heat stabilizing amount of Vitamin E.

A final contacting step is conducted using a third liquid medium comprising deionized water, a suitable buffer component and a suitable tonicity component. Such contacting occurs for about 30 minutes at room temperature with the application of ultrasonic energy to facilitate replacing the second liquid medium with the third liquid medium in the contact lens. This contacting provides a water swelled contact lens product containing an effective, heat stabilizing amount of Vitamin E. This water swelled contact lens product is ready for packaging in a conventional blister package.

Example 2

Example 1 is repeated except that, before the contacting with swelled contact lens, swelled with the first liquid medium, is contacted with a further liquid medium comprising 50% by weight of IMS and 50% by weight deionized water. This contacting occurs for 30 minutes at a temperature of less than about 25° C., for example, about 20° C. or room temperature. Ultrasonic energy is applied during this contacting to agitate the further liquid medium so as to facilitate replacing the first liquid medium with the further liquid medium in the contact lens. The contact lens produced by this processing is swelled with the further liquid medium. This swelled contact lens also contains an effective, heat stabilizing amount of Vitamin E since Vitamin E is largely insoluble in the further liquid medium. In this embodiment it may be advantageous to have a somewhat larger amount of Vitamin E present in the contact lens swelled with the first liquid medium since some of the Vitamin E may be removed from the contact lens during the contacting with the further liquid medium.

Using the further liquid medium in an intermediate contacting step between contacting the contact lens with the first liquid medium and contacting the contact lens with the second liquid medium, for example, as described in this Example 2, may reduce stress on the lens and/or damage to the lens caused by an abrupt change in environment from a substantially alcoholic liquid medium (first liquid medium) to a substantially aqueous medium (second liquid medium).

In any event, the further liquid medium swelled contact lens is contacted with the second liquid medium in substantially the same way as the first liquid medium swelled contact lens is contacted with the second liquid medium as described in Example 1.

Ultimately, this processing provides a swelled contact lens product containing an effective, heat stabilizing amount of Vitamin E ready for packaging in a conventional blister package.

Examples 3 and 4

Examples 1 and 2, respectively, are repeated except that, in each case, the single contact lens is replaced by 500 contact lenses with each lens being located in a space between two trays suitably structured to allow for effective contacting and mass exchange or transfer between the contact lens and the processing fluids.

Ultimately, each processing sequence, that is each of the series of steps described in Examples 1 and 2, provides 500 swelled contact lenses each of which contains an effective heat stabilizing amount of Vitamin E ready for packaging in a conventional blister package.

Example 5

Example 1 is repeated except that, instead of the step of contacting the lenses with a liquid medium including Vitamin E, the lenses are instead contacted with a liquid medium comprising about 95% by weight of IMS and about 5% by weight deionized water and no Vitamin E, prior to the step of being contacted with a liquid medium comprising 50% by weight IMS and about 50% by weight deionized water.

Since Vitamin E is not employed in this example, this particular method is especially useful for lenses made of polymeric compositions that do not require heat stabilization.

Thus, it may be understood from the disclosure herein, that lenses, such as silicon hydrogel contact lenses, that have been removed from individual lens molds may be placed in individual wells of colored trays. Each tray can hold 32 lenses. The trays are stacked upon each other and placed on or in cartridges. Each cartridge can contain 48 trays, and accordingly, each cartridge can contain 1536 contact lenses.

A cartridge containing the trays and lenses may be placed in a washing station or stage. In that regard, one embodiment of the present systems comprises four extraction stations, or four stations containing a solvent based extraction medium, and two hydration stations containing substantial amounts of water. The system also comprises two robotic arms. A cartridge is placed in the first extraction station using a robotic arm. The first extraction station comprises an extraction medium comprising about 90-95% IMS (ethanol/methanol blend) and 5-10% water. The cartridge and lenses are left in the first station for about 45 minutes. A robotic arm then removes the cartridge from the first station and places the cartridge in the second station for about 45 minutes. The second station comprises an extraction media which comprises at least 95% IMS. The robotic arm then removes the cartridge from the second station to the third station which contains at least 95% IMS. The robotic arm then removes the cartridge from the third station and places it in the fourth station which comprises an extraction medium of at least 99% IMS. The cartridge is removed from the fourth station by the robotic arm and placed in the fifth station which comprises an intermediate extraction/hydration medium of 50% IMS and 50% deionized water (plus or minus 10%). The robotic arm then removes the cartridge from the fifth station and places the cartridge in the sixth station containing at least 99% deionized water and less than 1% IMS.

As discussed herein, optionally, and depending on the particular polymeric material from which the lenses are formed, Vitamin E can be provided at station 4 in the above embodiment.

The media of the present systems is recycled, as discussed herein. Some volume of the media may be lost due to the recycling process. Typically, this loss is less than about five liters per hour. Therefore, it may be desirable to refresh one or more of the stations by adding fresh extraction media to the media contained in the stations. As one example, a method may comprise a step of adding about 25% of new extraction media to the used extraction media.

The present systems can extract and hydrate silicone hydrogel contact lenses and prepare them for packaging within about six hours from the initial extraction step, and in certain embodiments, the entire process can be performed in less than about two to three hours.

During the process, the system is vented using one or more vents to reduce the possibility of damage caused by IMS vapors. In addition, the systems and methods may maintain the ambient temperature at levels to reduce IMS vaporization and flammability.

Using the present systems, approximately 99.9% of the IMS can be recycled thereby resulting in substantial cost savings relative to existing systems which discard the organic solvents during the extraction process.

Certain aspects and advantages of the present invention may be more clearly understood and/or appreciated with reference to the following commonly owned U.S. patent applications, filed on Aug. 9, 2005, the disclosure of each of which is being incorporated herein in its entirety by this specific reference: U.S. patent application Ser. No. 11/200,848, entitled "Contact Lens Molds and Systems and Methods for Producing Same"; U.S. patent application Ser. No. 11/200,648, entitled "Contact Lens Mold Assemblies and Systems and Methods of Producing Same"; U.S. patent application Ser. No. 11/200,644, entitled "Systems and Methods for Producing Contact Lenses from a Polymerizable Composition"; U.S. patent application Ser. No. 11/201,410, entitled "Systems and Methods for Removing Lenses from Lens Molds"; U.S. patent application Ser. No. 11/200,862, entitled "Contact Lens Package"; U.S. Patent Application No. 60/707,029, entitled "Compositions and Methods for Producing Silicone Hydrogel Contact Lenses"; and U.S. patent application Ser. No. 11/201,409, entitled "Systems and Methods for Producing Silicone Hydrogel Contact Lenses".

A number of patents and publications have been mentioned hereinabove, each of which is incorporated herein in its entirety by this specific reference.

While this invention has been described with respect to various specific examples and embodiments, it is to be understood that the invention is not limited thereto and that it can be variously practiced within the scope of the following claims.

What is claimed is:

1. A method of processing silicone hydrogel contact lenses, the method comprises:
   extracting unextracted polymeric silicone hydrogel contact lenses containing an extractable material including unreacted monomers from formation of the polymeric silicone hydrogel contact lenses from polymerizable compositions by contacting the unextracted polymeric silicone hydrogel contact lenses containing the extractable material with a first water-containing extraction medium at conditions effective to reduce the content of the extractable material in the polymeric silicone hydrogel contact lenses and, subsequently, after the extracting has been completed,
   contacting the extracted polymeric silicone hydrogel contact lenses with an aqueous liquid medium at conditions effective to hydrate the polymeric silicone hydrogel contact lenses.

2. The method of claim 1, wherein the first water-containing extraction medium contains at least about 5% by weight of water.

3. The method of claim 1, wherein the first water-containing medium contains less than 100% water.

4. The method of claim 1, wherein the polymeric silicone hydrogel contact lenses subjected to the extracting are recently formed lenses.

5. The method of claim 1, wherein the polymeric silicone hydrogel contact lenses subjected to the extracting are newly formed lenses.

6. The method of claim 1, wherein the extracting unextracted polymeric silicone hydrogel contact lenses containing an extractable material comprises applying ultrasonic energy to the first water-containing extraction medium to facilitate intimate contacting between the extraction medium and the contact lenses.

7. The method of claim 1, wherein the step of extracting unextracted polymeric silicone hydrogel contact lenses further comprises, subsequently after contacting the unextracted polymeric silicone hydrogel contact lenses with the first water-containing extraction medium and prior to contacting the extracted polymeric silicone hydrogel contact lenses with the aqueous liquid medium, contacting the polymeric silicone hydrogel contact lenses with a second water-containing extraction medium at conditions effective to reduce the content of the first water-containing extraction medium in the polymeric silicone hydrogel contact lenses relative to the content of the first water-containing extraction medium in the polymeric silicone hydrogel contact lenses after the contacting with the first water-containing extraction medium, wherein the second water-containing extraction medium has an increased water concentration relative to the first water-containing extraction medium and a reduced water concentration relative to the aqueous liquid medium.

8. The method of claim 7, wherein the second water-containing extraction medium contains less than 100% water.

9. The method of claim 7, wherein the second water-containing extraction medium comprises used first water-containing extraction medium.

10. The method of claim 9, wherein the used first water-containing extraction medium has been reprocessed to remove extractable material from the used first water-containing extraction medium.

11. The method of claim 1, wherein the step of extracting unextracted polymeric silicone hydrogel contact lenses further comprises, subsequently after contacting the unextracted polymeric silicone hydrogel contact lenses with the first water-containing extraction medium and prior to contacting the extracted polymeric silicone hydrogel contact lenses with the aqueous liquid medium, contacting the polymeric silicone hydrogel contact lenses with a second water-containing extraction medium at conditions effective to reduce the content of the extractable material in the polymeric silicone hydrogel contact lenses relative to the content of the extractable material in the polymeric silicone hydrogel contact lenses after the contacting with the first water-containing extraction medium, wherein the second water-containing extraction medium has the same water concentration as the first water-containing extraction medium and a reduced water concentration relative to the aqueous liquid medium.

12. The method of claim 11, wherein the second water-containing extraction medium contains less than 100% water.

13. The method of claim 11, wherein the second water-containing extraction medium comprises used first water-containing extraction medium.

14. The method of claim 13, wherein the used first water-containing extraction medium has been reprocessed to remove extractable material from the used first water-containing extraction medium.

* * * * *

UNITED STATES PATENT AND TRADEMARK OFFICE
CERTIFICATE OF CORRECTION

PATENT NO. : 7,629,436 B2  Page 1 of 1
APPLICATION NO. : 12/002837
DATED : December 8, 2009
INVENTOR(S) : Brame et al.

It is certified that error appears in the above-identified patent and that said Letters Patent is hereby corrected as shown below:

Column 2, item (74) *Attorney, Agent, or Firm—* "Stout, Uxa, Bayan & Mullins, LLP" should read --Stout, Uxa, Buyan & Mullins, LLP--.

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,629,436 B2  
APPLICATION NO. : 12/002837  
DATED : December 8, 2009  
INVENTOR(S) : Brame et al.

Page 1 of 1

It is certified that error appears in the above-identified patent and that said Letters Patent is hereby corrected as shown below:

<u>Front Page of Patent</u>

Column 1, item (73) Assignee: "CooperVision International Holding Compound, LP" should read --CooperVision International Holding Company, LP--.

Signed and Sealed this
Twenty-sixth Day of April, 2011

David J. Kappos
*Director of the United States Patent and Trademark Office*